(12) United States Patent
Day et al.

(10) Patent No.: US 6,981,072 B2
(45) Date of Patent: Dec. 27, 2005

(54) MEMORY MANAGEMENT IN MULTIPROCESSOR SYSTEM

(75) Inventors: Michael Norman Day, Round Rock, TX (US); Harm Peter Hofstee, Austin, TX (US); Charles Ray Johns, Austin, TX (US); James Allan Kahle, Austin, TX (US); David Shippy, Austin, TX (US); Thuong Quang Truong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 10/455,169

(22) Filed: Jun. 5, 2003

(65) Prior Publication Data

US 2004/0249995 A1    Dec. 9, 2004

(51) Int. Cl.⁷ .............................................. G06F 13/00
(52) U.S. Cl. ................. 710/22; 710/308; 711/200; 711/100
(58) Field of Search ..................... 711/3, 202, 203, 711/206, 207, 210, 169–170, 147, 100, 122, 711/139, 141, 150, 209, 144; 710/22, 26, 710/3, 5, 308; 345/522, 531

(56) References Cited

U.S. PATENT DOCUMENTS

| | | | |
|---|---|---|---|
| 5,687,392 A * | 11/1997 | Radko | 710/22 |
| 5,765,022 A * | 6/1998 | Kaiser et al. | 710/22 |
| 6,260,131 B1 * | 7/2001 | Kikuta et al. | 711/210 |
| 6,681,346 B2 * | 1/2004 | James et al. | 714/42 |
| 2003/0009640 A1 * | 1/2003 | Arimilli et al. | 711/147 |
| 2003/0097536 A1 * | 5/2003 | Atherton et al. | 711/170 |
| 2003/0177326 A1 * | 9/2003 | Luick | 711/169 |
| 2004/0073765 A1 * | 4/2004 | Arimilli et al. | 711/202 |

* cited by examiner

*Primary Examiner*—Christopher Shin
(74) *Attorney, Agent, or Firm*—Carr LLP; Diana R. Gerhardt

(57) ABSTRACT

A system and a method are provided for improving memory management in a multiprocessor system. A direct memory access (DMA) operation is set up for a first processor. A DMA effective address is translated to a virtual address. The virtual address is translated to a physical address, which is used to access a memory hierarchy of the multiprocessor system.

24 Claims, 3 Drawing Sheets

MEMORY MANAGEMENT IN MULTIPROCESSOR SYSTEM

BACKGROUND OF THE INVENTION

1. Field of the Invention

The invention relates generally to a memory management mechanism of a multiprocessor system and, more particularly, to applying a virtual memory scheme to a direct memory access (DMA) mechanism.

2. Description of the Related Art

A common technique in computer systems is to provide one large virtual address space, which divides a physical memory into smaller blocks called segments and pages. These smaller blocks can then be allocated to different processes. In a conventional symmetric multiprocessor (SMP) system, multiple processors have access to this common shared virtual address space and physical memory. Each processor has a memory management unit (MMU), which translates processor instruction and data addresses to physical memory addresses.

Typically, a non-homogeneous multiprocessor system has one or more general-purpose processors such as processing units (PUs) on the one hand and one or more special-purpose processors such as synergistic processor units (SPUs) on the other hand. Such a non-homogenous multiprocessor system also has a system memory. The general-purpose processors generally use virtual addresses to access and manage the system memory. Typically, a memory management unit (MMU) coupled to a general-purpose processor takes care of accessing and managing the system memory by means of the virtual addresses. By contrast, special-purpose processors generally adopt a direct memory access (DMA) mechanism, which utilizes only physical addresses. Thus, the different types of processors cannot access the same object stored in the system memory with the same virtual address. This leads to difficulty in building a cooperative programming model between programs running in those different types of processors.

In some cases, SMP systems may have one or more processors having a DMA mechanism on the one hand and one or more processors using a virtual memory system on the other hand. In such cases, the processors having the DMA mechanism use only the physical addresses of their memory hierarchy. Hence, the similar problem and/or difficulty as mentioned above in relation to the non-homogeneous multiprocessor system.

Therefore, a need exists for a system and a method for improving memory management in a multiprocessor system.

SUMMARY OF THE INVENTION

The present invention provides a system and a method for improving memory management in a multiprocessor system. A direct memory access (DMA) operation is set up for a first processor. A DMA effective address is translated to a virtual address. The virtual address is translated to a physical address, which is used to access a memory hierarchy of the multiprocessor system.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be apparent to those skilled in the art that the present invention may be practiced without such specific details. In other instances, well-known elements have been illustrated in schematic or block diagram form in order not to obscure the present invention in unnecessary detail.

It is further noted that, unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
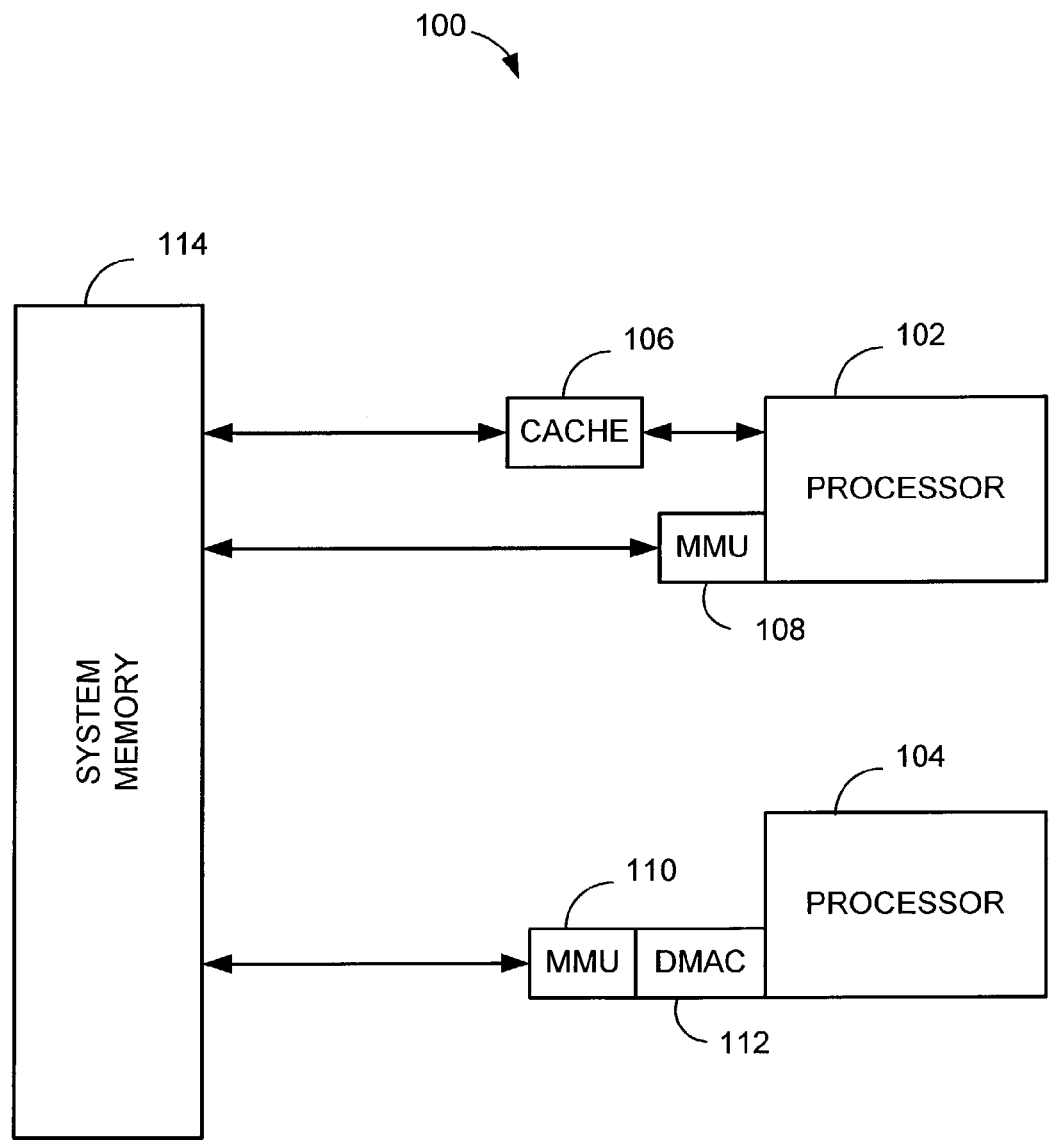
FIG. 1 is a block diagram illustrating a multiprocessor system adopting a virtual memory mechanism for direct memory access (DMA) commands.

Referring to FIG. 1 of the drawings, the reference numeral 100 generally designates a multiprocessor system adopting a virtual memory mechanism for direct memory access (DMA) commands. The multiprocessor system 100 comprises a first processor 102, a second processor 104, a cache 106, a first memory management unit (MMU) 108, a second MMU 110, a direct memory access controller (DMAC) 112, and a system memory 114. The processor 102 is coupled to the cache 106 and the first MMU 108. The second processor 104 is coupled to the DMAC 112, which is coupled to the second MMU 110. The system memory 114 is coupled to the cache 106, the first MMU 108, and the second MMU 110. Optionally, there may be one or more additional processors (not shown), such as the first processor 102. Similarly, there may be one or more additional processors (not shown), such as the second processor 104. The same principle set forth herein should apply to the expanded case without departing from the true spirit of the present invention.

The first processor 102 accesses the cache 106 and/or the system memory 114 by utilizing the first MMU 108, which translates effective addresses to virtual addresses and then translates the virtual addresses to physical addresses. The second processor 104 relies on the DMAC 112 to communicate with the system memory 114. Once assigned this task, the DMAC 112 utilizes the second MMU 110 to translate DMA effective addresses to virtual addresses and then translate the virtual addresses to physical addresses. These physical addresses can be used to access the memory hierarchy of the system (e.g., the system memory 114, the cache 106, etc.). This provides the capability for DMA operations to support full virtual memory semantics. For example, the DMA operations can check permissions, page-fault, allow software to resolve the fault (provide a page mapping), and be restarted.

The first processor 102 and the second processor 104 can have their own independent private virtual address space. Alternatively, they can share a virtual address space. Objects in the system memory 114 referenced by an effective address in the first processor 102 part of the program can be referenced by the same effective address in the second processor 104 part of the program indirectly using DMA commands. Additionally, the first MMU 108 and/or the second MMU 110 can be programmed to use a hardware tablewalk or a software tablewalk. When hardware tablewalk is enabled, the first MMU 108 and the second MMU 110 can all share a common page table. Alternatively, one or more of the MMUs can use separate page tables.

Figure 2:
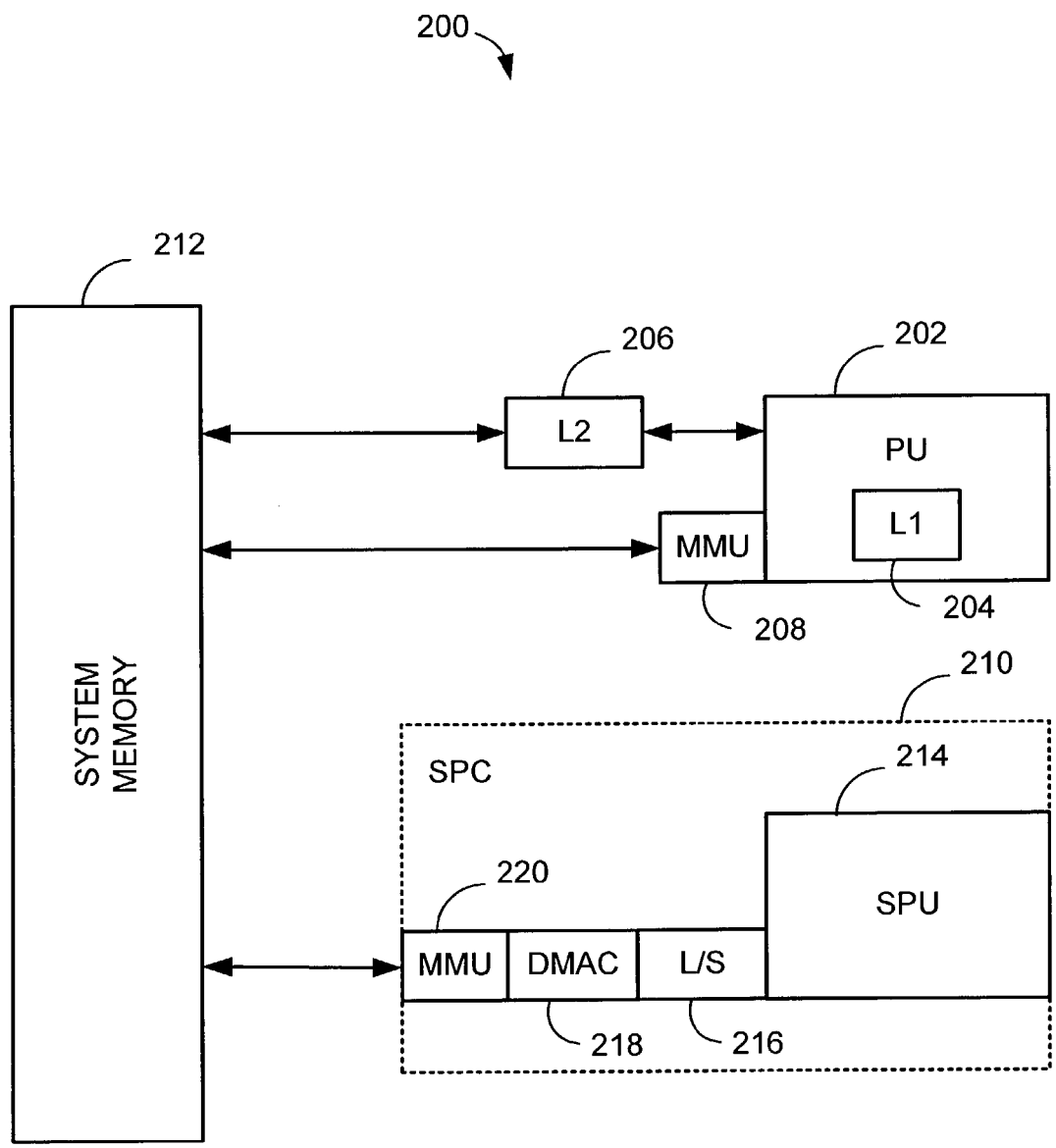
FIG. 2 is a block diagram illustrating a preferred embodiment of a non-homogeneous multiprocessor system.

Now referring to FIG. 2, a block diagram 200 illustrates a preferred embodiment of a non-homogeneous multiprocessor system. The non-homogeneous multiprocessor system 200 comprises a processing unit (PU) 202 including an L1 cache 204, an L2 cache 206, a first MMU 208, a synergistic processor complex (SPC) 210, and a system memory 212. The SPC 210 includes a synergistic processor unit (SPU) 214, a local storage (L/S) 216, a DMAC 218, and a second MMU 220. The PU 202 is coupled to the L2 cache 206 and the first MMU 208. The SPU 214 is coupled to the L/S 216, which is coupled to the DMAC 218. The DMAC 218 is coupled to the second MMU 220. The system memory 212 is coupled to the L2 cache 206, the first MMU 208, and the second MMU 220 (or the SPC 210). Optionally, there may be one or more additional processors (not shown), such as the PU 202. Similarly, there may be one or more additional processors (not shown), such as the SPC 210. The same principle set forth herein should apply to the expanded case without departing from the true spirit of the present invention. Note that the SPU 214 is an auxiliary processor unit (APU), where the PU is a PowerPC™. Generally, the SPU 214 represents any type of APU.

The PU 202 accesses the L2 cache 206 and/or the system memory 212 by utilizing the first MMU 208, which translates effective addresses to virtual addresses and then translates the virtual addresses to physical addresses. These physical addresses can be used to access the memory hierarchy of the system (e.g., the L1 cache 204, the L2 cache 206, the system memory 212, etc.). The SPU 214 relies on the DMAC 218 to communicate with the system memory 212. Once assigned this task, the DMAC 218 utilizes the second MMU 220 to translate DMA effective addresses to virtual addresses and then translate the virtual addresses to physical addresses. This provides the capability for DMA operations to support full virtual memory semantics. For example, the DMA operations can check permissions, page-fault, allow software to resolve the fault (provide a page mapping), and be restarted.

The PU 202 and the SPU 214 can have their own independent private virtual address space. Alternatively, they can share a virtual address space. The SPU can be provided a private physical memory space, a shared physical memory space, or a combination of both. This provides the capability for the SPU 214 to take advantage of the high performance access to its own private local storage, while still retaining aspects of a shared memory programming environment. Objects in the system memory 212 referenced by an effective address in the PU 202 part of the program can be referenced by the same effective address in the SPU 214 part of the program indirectly using DMA commands. Additionally, the first MMU 208 and/or the second MMU 220 can be programmed to use a hardware tablewalk or a software tablewalk. When hardware tablewalk is enabled, the first MMU 208 and the second MMU 220 can all share a common page table. Alternatively, one or more of the MMUs can use separate page tables. Preferably, the second MMU 220 can be programmed to respond to a translation lookaside buffer invalidate entry (TLBIE) instructions (e.g., PowerPC™ TLBIE) when using a common page table. Alternatively, the second MMU 220 can be programmed to ignore this instruction if using a private page table.

The present invention provides the capability for a plurality of processes (with their own effective/virtual address spaces) to timeshare these synergistic (or auxiliary) processor units. In other words, the system 200 extends to a case where a plurality of APUs is used in combination with one or more PUs. The SPUs (or APUs) can be timeshared by multiple processes since the addressability of the SPUs (APUs) to system memory is likewise translated from an effective address to a virtual address to a physical addresss.

Figure 3:
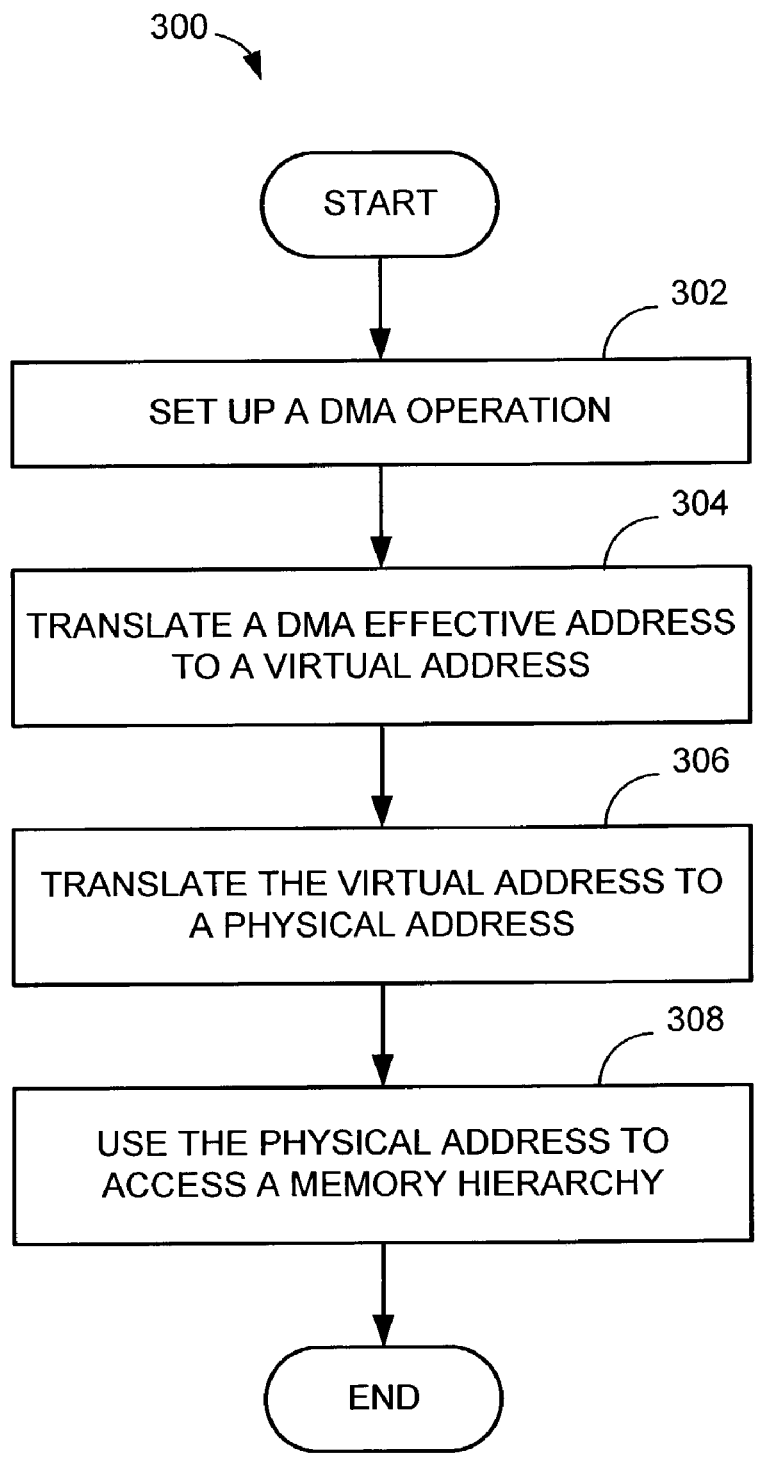
FIG. 3 is a flow diagram illustrating a memory management scheme in a multiprocessor system.

In FIG. 3, a flow diagram illustrates a memory management scheme 300 in a multiprocessor system as shown in FIGS. 1 and 2. In step 302, a DMA operation is set up. In step 304, a DMA effective address is translated to a virtual address. In step 306, the virtual address is translated to a physical address. In step 308, the physical address is used to access a memory hierarchy.

It will be understood from the foregoing description that various modifications and changes may be made in the preferred embodiment of the present invention without departing from its true spirit. This description is intended for purposes of illustration only and should not be construed in a limiting sense. The scope of this invention should be limited only by the language of the following claims.

What is claimed is:

1. A non-homogeneous, asymmetric multiprocessor system, comprising:
   a general-purpose processor;
   a special-purpose processor;
   a first memory management unit (MMU) coupled to the general-purpose processor to translate an effective address received from the general-purpose processor into a first physical address;
   a direct memory access controller (DMAC) coupled to the special-purpose processor to translate a DMA command received from the special-purpose processor into an address;
   a second MMU coupled to the DMAC to translate the address into a second physical address; and
   a system memory coupled to both the first and second MMUs, wherein the system memory is accessed by the general-purpose processor and the special-purpose processor via the first and second physical addresses respectively.

2. The multiprocessor system of claim 1, wherein the general-purpose processor has an L1 cache, the system further comprising an L2 cache coupled between the general-purpose processor and the system memory.

3. The multiprocessor system of claim 1, wherein the first MMU translates the effective address into a first virtual address and then translates the first virtual address into the first physical address of the system memory.

4. The multiprocessor system of claim 3, wherein the address is a DMA effective address, and wherein the second MMU translates the DMA effective address into a second virtual address, and then translates the second virtual address into the second physical address of the system memory.

5. The multiprocessor system of claim 4, wherein the first and second physical addresses are identical when the first and second virtual addresses are identical.

6. The multiprocessor system of claim 1, wherein the general-purpose processor is a processing unit (PU), wherein the PU communicates with the system memory through the first MMU.

7. The multiprocessor system of claim 1, wherein the special-purpose processor is a synergistic processing unit (SPU), wherein the SPU communicates with the system memory only through the DMAC and the second MMU.

8. The multiprocessor system of claim 7, wherein the system further comprises a local storage coupled between the SPU and the DMAC, wherein only the SPU can access the local storage.

9. The multiprocessor system of claim 1, further comprising:
one or more additional special-purpose processors;
a corresponding number of the DMACs, each DMAC being coupled to a corresponding one of the one or more additional special-purpose processors; and
a corresponding number of the MMUs, each MMU being coupled between a corresponding one of the DMACs and the system memory.

10. The multiprocessor system of claim 1, wherein the general-purpose and special-purpose processors have their own independent private virtual address space.

11. The multiprocessor system of claim 1, wherein the general-purpose and special-purpose processors share a virtual address space.

12. The multiprocessor system of claim 1, further comprising:
a computer program having first and second program portions respectively running on the general-purpose and special-purpose processors; and
an object stored in the system memory and referenced by an effective address in the first program portion, wherein the object is referenced by the same effective address in the second program portion indirectly using DMA commands.

13. The multiprocessor system of claim 1, wherein the first MMU is programmed to use a tablewalk feature.

14. The multiprocessor system of claim 1, wherein the second MMU is programmed to use a tablewalk feature.

15. The multiprocessor system of claim 13, wherein the tablewalk feature is implemented using hardware.

16. The multiprocessor system of claim 13, wherein the tablewalk feature is implemented using software.

17. The multiprocessor system of claim 14, wherein the first and second MMUs can all share a common page table.

18. The multiprocessor system of claim 14, wherein the first and second MMUs use separate page tables.

19. A method for improving memory management in a non-homogeneous, asymmetric multiprocessor system, the method comprising the steps of:
receiving an effective address from a general-purpose processor;
translating the received effective address into a first physical address through a first memory management unit (MMU) coupled to the general-purpose processor;
receiving a direct memory access (DMA) command from a special-purpose processor;
translating the received DMA command into an address through a DMA controller (DMAC) coupled to the special-purpose processor;
translating the address into a second physical address through a second MMU coupled to the DMAC;
the general-purpose processor accessing a system memory coupled to the first and second MMUs via the first physical address; and
the special-purpose processor accessing the system memory via the second physical address.

20. The method of claim 19, further comprising the step of the general-purpose processor accessing the system memory without using a DMA operation.

21. The method of claim 20, further comprising the step of the special-purpose and general-purpose processors sharing an effective address space.

22. A computer program product for improving memory management in a non-homogenous asymmetric multiprocessor system, the computer program product having a medium with a computer program embodied thereon, the computer program comprising:
computer program code for receiving an effective address from a general-purpose processor;
computer program code for translating the received effective address into a first physical address through a first memory management unit (MMU) coupled to the general-purpose processor;
computer program code for receiving a direct memory access (DMA) command from a special-purpose processor;
computer program code for translating the received DMA command into an address through a DMA controller (DMAC) coupled to the special-purpose processor;
computer program code for translating the address into a second physical address through a second MMU coupled to the DMAC;
computer program code for the general-purpose processor to access a system memory coupled to the first and second MMUs via the first physical address; and
computer program code for the special-purpose processor to access the system memory via the second physical address.

23. The computer program product of claim 22, the computer program further comprising computer program code for enabling the general-purpose processor to access the system memory without using a DMA operation.

24. The computer program product of claim 23, the computer program further comprising computer program code for enabling the special-purpose and general-purpose processors to share an effective address space.

\* \* \* \* \*